2,816,008
RECOVERY OF SELENIUM FROM SCRAP SELENIUM RECTIFIERS

Paul W. von Stein, Woodbridge, and Yurii E. Lebedeff, Metuchen, N. J., assignors to American Smelting and Refining Company, New York, N. Y., a corporation of New Jersey No Drawing. Application December 6, 1955, Serial No. 551,200

2 Claims. (Cl. 23—209)

This invention relates to a method of recovering elemental selenium contained in scrap selenium rectifiers and the like. More particularly, it relates to the recovery of the elemental selenium contained in scrap selenium rectifiers having an aluminum metal base.

Broadly, the invention comprehends contacting such scrap material with a molten alkali metal hydroxide to incorporate the elemental selenium into the molten hydroxide, and then recovering the selenium values from the latter. In the preferred mode of practicing the invention, the scrap is immersed and agitated in a pool of molten sodium hydroxide maintained at about 800–900° F., until a desired amount of selenium has been removed from the scrap. Such selenium removal is most effectively accomplished by placing the scrap in a suitable open-mesh container, for example a metal basket. The container is then dipped into the pool to submerge the scrap; agitation being supplied by moving the basket in the pool, preferably by an up and down motion of the basket. It has been found that under the preferred conditions, substantially all the elemental selenium in the scrap is dissolved therefrom in about one-half to two minutes. In most instances encountered, substantially all the elemental selenium in the scrap is dissolved in about thirty seconds.

The selenium values thus incorporated into the molten hydroxide may be recovered therefrom in any suitable manner. For example, the selenium-containing hydroxide from the process may be oxidized with an oxidizing agent such as sodium nitrate to convert the selenium therein to a water soluble state. The thus treated hydroxide may then be leached with an aqueous solution, the resulting leach solution acidified for example with sulfuric acid, and elemental selenium precipitated from the acid solution with sulfur dioxide.

The scrap metal comprehended by the invention, such as scrap selenium rectifiers and the like, comprises a metal base (usually in the form of a plate) having a thin layer of elemental selenium associated therewith. The metal base may be an iron or aluminum metal base or a base fabricated of other metal or alloy. Generally, the metal base has a melting point substantially higher than that of selenium. The selenium may be deposited directly on the metal base usually with one or more layers of other low melting materials, such as elemental bismuth, cadmium, or tin, associated therewith, generally as thin layers above the selenium layer on the metal base. Spacer material may also be disposed between the individual plates of a rectifier stack. Such material may be an organic material such as rubber, plastic, etc. or it may be a metal such as zinc. In addition, the entire stack may be coated, in any suitable manner, as by dipping, with a suitable protective coating material, for example an organic material such as shellac, paint, lacquer, enamel, etc., which may or may not contain inorganic filler material.

It also has been found that bismuth, cadmium, tin and similar low melting metal values tend to collect as a pool of molten metal beneath the molten hydroxide. Any such metal layer may be separated from the melt in any suitable manner, for example by tapping or allowing the entire melt to solidify, after which the solidified layers may then be separated. The thus separated metallic layer may be recovered as such as a product from the process or it may be further treated to separate the various metals which may be contained in it. One of the advantages of the invention, therefore, is that it affords a means of effecting a bulk separation of the selenium from other low melting constituents such as bismuth, cadmium and tin which may be contained in the scrap.

Physically, the scrap may occur as a mass of individual rectifier plates, a mass of stacks (a stack being known in the rectifier art as a plurality of individual rectifier plates associated together in spaced relationship), a mass of so-called "odds and ends" such as elemental selenium-containing scrap obtained in the manufacture of rectifiers, or mixtures of such scrap. Much of the scrap encountered has an aluminum alloy metal base containing a major proportion, and usually about 90% or more, of aluminum, although considerable amounts of scrap having an iron metal base are also encountered.

An important feature of the invention is that the metal base of the scrap is chemically unaffected by the molten hydroxide; this being particularly important where the scrap has an aluminum base. Another important feature is that the presence of organic material in the scrap, either or both as spacer material or as a protective coating, does not interfere with the rapid and efficient removal of the selenium or other low melting metals, from the scrap. For best results in practicing the invention, the molten hydroxide is maintained at a temperature below the melting point of the metal base and as stated above preferably at about 800–900° F., thereby increasing the amount of the removed selenium which is incorporated into the hydroxide and in addition allowing the aluminum or iron metal base to remain physically unaffected by the hydroxide. After the layer or layers of the relatively low melting material are removed from the metal base by the molten caustic, the metal base may be removed from the caustic and recovered as such as a product from the process, or further treated to separate and recover the metal values therein.

Another advantage of the invention is that it provides a simple and relatively cheap method of recovering elemental selenium contained in scrap rectifiers and the like. These and other advantages will become apparent from the accompanying examples. It should be understood, however, that the examples are given for purposes of illustration and that the invention in its broader aspects is not limited thereto.

In each of the examples set forth in Table I, the indicated total amounts and physical types of aluminum base rectifier scrap which contained bismuth and cadmium in addition to elemental selenium were dipped in 100 pounds of molten sodium hydroxide maintained, in an appropriate iron container, at a temperature of 800–900° F. The various stacks in the examples contained a protective coating of an organic material such as shellac, paint, lacquer and enamel mixed with inorganic filler and pigment material. About half of the stacks contained rubber or other organic spacer material and the rest contained zinc as the spacer material. In each of the examples the dipping was accomplished by placing 10 pound portions of the scrap in an open-mesh iron basket, immersing the contents of the basket in the molten caustic, moving the basket up and down therein for approximately 30 seconds and then removing the basket which still contained the aluminum base metal from the molten hydroxide. This procedure was repeated until the total amount of scrap indicated for each example was dipped. Thereafter the molten layer of metal (the so-called "heel") which collected beneath the molten caustic was separated from the latter by tapping. The thus separated heel metal and caustic were weighed and analyzed after solidification, the heel metal being remelted before analysis. A total of 100.75 pounds of heel metal were obtained before the remelting step. The results obtained are set forth in Table I.

The recovered aluminum base metal from the various examples was combined and the combined metal washed with water. A total of 1471.5 pounds of base metal was recovered. The wash water and representative samples of the combined metal were analyzed for selenium. The wash water was found to contain 0.84 pound of selenium. The average selenium content of the base metal was found to be 0.053%. The combined base metal then was separated into three classes according to size, i. e. large, medium and small; each of which was weighed, melted and then analyzed. The results obtained as to this base metal are set forth in Table II.

The selenium containing hydroxide from the various examples was combined. The composite was remelted and treated with sodium nitrate until all of the selenium values therein were in a water soluble state. The melt was then allowed to solidify after which it was leached with an aqueous solution. The leach solution was acidified and the acidified solution was gased with SO₂ to precipitate elemental selenium. 97.9% of the selenium contained in the composite hydroxide was recovered.

What is claimed is:

1. A method of recovering selenium values from selenium contained on an aluminum metal base in selenium rectifier scrap which comprises immersing said scrap in a molten pool comprising an alkali metal hydroxide maintained at a temperature not in excess of about 900° F. whereby substantially all of the elemental selenium in said scrap is removed therefrom and is incorporated into said alkali metal hydroxide in about ½ to 2 minutes without substantial effect on the metal base of said scrap, thereafter physically removing the metal base from the molten pool, and recovering the selenium values contained in the alkali metal hydroxide.

2. A method of treating selenium rectifier scrap containing selenium deposited on an aluminum alloy metal base to recover selenium values from the selenium contained on said metal base which comprises immersing said scrap in a molten pool comprising molten sodium hydroxide maintained at a temperature not in excess of about 900° F., agitating said scrap while immersed in said pool, whereby substantially all of the elemental selenium values in said scrap is removed therefrom and is incorporated into said molten hydroxide in about ½ to 2 minutes without substantial effect on said metal base of said scrap, thereafter physically removing the metal base from the molten pool, and recovering the selenium values contained in the alkali metal hydroxide.

TABLE I

| Example | Amt. and Type of Rectifier Scrap | Lbs. Se Containing NaOH Recovered | Composition of Hydroxide, Percent | | | Heel Metal | | | |
|---|---|---|---|---|---|---|---|---|---|
| | | | Se | Bi | Cd | Orig. Wt., Lbs. | Remelt Wt., Lbs. | Percent Bi | Percent Cd |
| 1 | 200#, Stacks | 115 | 19.5 | 0.16 | 2.2 | 4.75 | | | |
| 2 | do | 109 | 18.6 | 0.31 | 3.9 | 47.5 | 33 | 44.4 | 47.4 |
| 3 | do | 110 | 17.9 | 0.22 | 3.4 | 16.25 | | | |
| 4 | 231#, Stacks and Plates | 107 | 22.8 | 0.83 | 4.0 | 13 | 8.1 | 51.2 | 51.2 |
| 5 | 250#, Plates | 137 | 26.1 | 0.97 | 5.4 | 13 | 9.8 | 96.4 | 5.2 |
| 6 | 200#, Stacks and Plates | 137 | 24.4 | 0.88 | 6.0 | 12.5 | 10.7 | 100 | 1.3 |
| 7 | 180#, Stacks and Plates | 112 | 22.4 | 0.93 | 5.5 | 10 | 8.1 | 100 | 0.4 |
| 8 | 140#, Stacks | 134 | 14.3 | 0.21 | 3.4 | 4 | 3.1 | 100 | 0.4 |
| 9 | 195#, Stacks plus odds and ends | 108 | 19.7 | 0.48 | 3.7 | 7 | 4.5 | 98.0 | 2.9 |
| 10 | 130#, Odds and ends | 135 | 20.2 | 0.50 | 3.0 | 7 | 6.8 | 86.8 | 17.1 |
| Total | 1926# | 1,204# | 248.8# Se | | | | | | |

TABLE II

*Aluminum metal base recovered*

| Class | Large | Medium | Small |
|---|---|---|---|
| Wt. (lbs.) | 573 | 500 | 398 |
| Melted Wt. (percent of orig.) | 81 | 49 | 59 |
| Cu, percent | 0.55 | 1.45 | 20.33 |
| Sn, percent | Nil | 0.04 | 0.12 |
| Pb, percent | 0.01 | 0.13 | 0.12 |
| Zn, percent | | 2.10 | 6.13 |
| Fe, percent | 0.49 | 1.08 | 4.75 |
| Ni, percent | 0.01 | 0.37 | 0.05 |
| Si, percent | 0.16 | 0.48 | 0.07 |
| Mg, percent | 0.25 | 0.82 | 0.86 |
| Mn, percent | 0.13 | 0.13 | 0.08 |
| Cr, percent | 0.04 | 0.16 | 0.18 |
| Ti, percent | 0.01 | 0.04 | 0.01 |
| Se, percent | <0.01 | <0.01 | <0.01 |
| Balance | Al | Al | Al |

References Cited in the file of this patent

UNITED STATES PATENTS

| 1,415,526 | Chikashig et al. | May 9, 1922 |
| 1,945,074 | Ralston et al. | Jan. 30, 1934 |
| 2,010,870 | Lindblad | Aug. 13, 1935 |
| 2,048,563 | Poland | July 21, 1936 |

FOREIGN PATENTS

| 440,004 | Great Britain | Dec. 18, 1935 |